MAGNETIC SYSTEMS

Filed Feb. 28, 1956

INVENTOR.
THOMAS H. MOORE
BY
ATTORNEY

United States Patent Office 2,898,579

Patented Aug. 4, 1959

2,898,579

MAGNETIC SYSTEMS

Thomas H. Moore, New Brunswick, N.J., assignor to Radio Corporation of America, a corporation of Delaware Application February 28, 1956, Serial No. 568,408

7 Claims. (Cl. 340—174)

This invention relates to magnetic systems, and particularly to magnetic shift registers.

Magnetic devices and systems for handling binary signals have been developed that employ magnetic cores made of material having a substantially rectangular hysteresis characteristic. These magnetic systems have the advantages of indefinite life and small size. Among such magnetic systems that have been developed are magnetic shift registers. In magnetic shift registers, binary signals are stored in magnetic cores in the form of the residual flux of the cores, which flux may assume either one of two directions. The cores are coupled in series by means of a separate temporary storage unit between each adjacent pair of cores. Signals are stepped along to successive cores in response to shift pulses applied to the cores. The binary signals are stored during the shift in the temporary storage units. Examples of magnetic shift registers are described in the copending patent applications Serial No. 440,718, filed July 1, 1954, and Serial No. 508,158, filed May 13, 1955, by V. L. Newhouse and assigned to the assignee of this application. Magnetic shift registers have been found useful in ring counter, switching, information handling, and pulse commutating circuits. It is among the objects of this invention to provide:

An improved magnetic device for handling pulse signals;

An improved magnetic shift register in which noise signals are substantially eliminated;

An improved and simple magnetic register that may be employed as a ring counter.

In accordance with this invention, input, output, and advance windings are linked to a plurality of saturable magnetic cores having an ordinal relationship. The output winding of each core is coupled to the input winding of the succeeding core through a temporary storage circuit that includes at least one unilateral impedance and electrical storage means. An impedance connected in circuit with the advance windings is employed to develop a bias voltage during the application of advance pulses to the advance windings. This bias voltage is applied to certain ones of the unilateral impedances and to the electrical storage means to control the flow of signals between cores during the advance operation, and to control the voltage at the electrical storage means to eliminate noise signals.

Figures 1, 2, 3, 4:
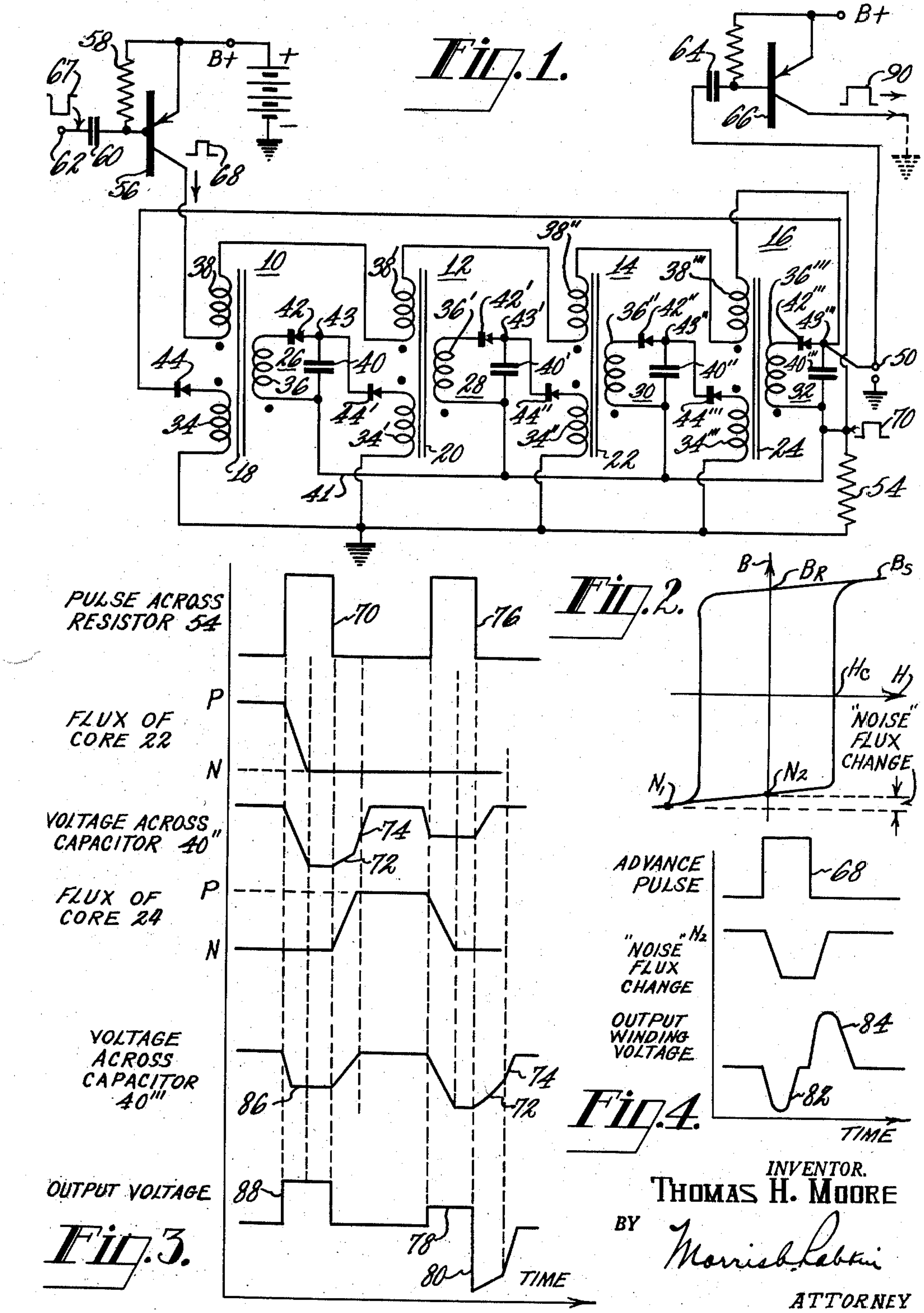
Figure 1 is a schematic circuit diagram of an embodiment of this invention in which magnetic units are connected in a magnetic stepping register.
Figure 2 is an idealized graph of a somewhat rectangular hysteresis characteristic of magnetic cores that may be employed in this invention.
Figure 3 is an idealized graph, on the same time base, of the waveforms occurring in portions of the circuit of Figure 1.
Figure 4 is an idealized graph, on the same time base, of waveforms that are produced with cores having a somewhat non-rectangular hysteresis characteristic.

Shown in Figure 1 is the circuit diagram of a stepping register made up of a series of magnetic units or stages 10 to 16. The units 10 to 16 are the same, and include, respectively, magnetic cores 18 to 24 and coupling circuits 26 to 32. Only the first unit 10 is described in detail. Corresponding parts in the second, third, and fourth stages 12, 14, and 16 are referenced by the same numerals with the addition of a prime ('), double prime (") and triple prime ('''), respectively.

The magnetic cores 18 to 24 are preferably made of a material having a substantially rectangular hysteresis curve of the type shown in Figure 2. Desirable characteristics of the core material are a high saturation flux density $B_s$, and a low coercive force $H_c$. Opposite magnetic states or directions of flux in a core are represented by P and N. If a magnetizing force tending to change the flux to direction N is applied to a core which is already in state N, a relatively small change in the core flux density takes place. Ideally, if the magnetizing force in a flux reversing direction is less than the coercive force, the flux density does not change, and the residual magnetism is substantially unchanged. In practice, the magnetic cores are sufficiently close to the ideal to have two stable remanent states. Various core geometries may be appropriate; for example, toroidal cores may be used.

Linked to the first core 18 are an input winding 34, an output winding 36, and an advance winding 38. The relative directions of linkage or polarities of the windings are indicated by dots next to terminals of the windings in accordance with the usual transformer convention. The coupling circuit 26 is connected between the output winding 36 of the first core 18 and the input winding 34' of the succeeding core 20 in the series. The coupling circuit 26 includes a capacitor 40 connected across the output winding 36 and connected at one terminal to a bus 41. The other terminal 43 of the capacitor 40 is connected through a charge diode 42 to the unmarked terminal of the output winding 36 and also through a discharge diode 44' to the marked terminal of the input winding 34' of the succeeding core 20. The diodes 42, 44' are poled, respectively, to pass negative pulses from the unmarked terminal of the output winding 36 to the capacitor 40, and negative pulses from the capacitor 40 to the marked terminal of the succeeding input winding 34'.

The shift register is connected as a ring counter by connecting the terminal 43''' of the capacitor 40''' through the diode 44 to the marked terminal of the first core 18 input winding 34. An output terminal 50 is connected to the capacitor 40''' of the last core coupling circuit 32 at the junction 43'''.

The advance windings 38 of all the units 10 to 16 are connected in series with each other (unmarked terminal of one to marked terminal of the succeeding stage) and at the unmarked terminal of the winding 38''' to a terminal of a resistor 54, the other terminal of which is connected to a common reference potential connection shown as ground. The bus 41 is directly connected to the junction of the resistor 54 and the winding 38'''. The unmarked terminals of the input windings 34 to 34''' are connected to ground. The marked terminal of the winding 38 is connected to the collector of a transistor 56, the emitter of which is connected to B+. The base is connected through a resistor 58 to B+, and through a capacitor 60 to an input terminal 62. In the quiescent state of the transistor 56, there is zero base current and a high collector-emitter impedance. The output terminal 50 is coupled through a capacitor 64 to the base of a second transistor 66 connected in a manner similar to the first transistor 56. The collector of the transistor 66 may be connected to the advance windings of another ring counter (not shown). The transistors 56, 66 may be of the same type, namely, for example, type P–N–P.

Successive negative-going pulses 67 are applied to the base of the transistor 56 from any appropriate timing pulse source (not shown). A low collector-emitter impedance is produced by such timing pulses 67, resulting in rectangular current pulses 68 that are applied to the series advance windings 38 to 38‴ and resistor 54. These advance pulses 68 are of sufficient amplitude to apply to each core 18 to 24 a magnetizing force in excess of the coercive force $H_c$, indicated in Figure 2. The advance pulses 68 tend to drive all of the cores 18 to 24 to state N and to produce a positive-going voltage pulse 70 across the resistor 54.

The shifting of binary signals through the stepping register is explained by considering the third core 22 in the P state and all the other cores 18, 20, 24 in the N state. Figure 3 illustrates somewhat idealistically the waveforms that are produced in the shift of the signal represented by a P state in the third core 22 to the fourth core 24.

An advance pulse 68 tends to set every magnetic core 18 to 24 to state N. However, since all but the third core 22 are already in state N, the only flux change associated with this advance pulse 68 occurs in the third core 22. The third core 22 is driven to state N, and a voltage pulse is induced in the third core output winding 36″, which pulse is passed by the diode 42″ to charge the associated storage capacitor 40″ to a negative potential. During the advance pulse 68, the voltage pulse 70 is applied to the bus 41. The voltage of the pulse 70 is substantially larger than the voltage across the capacitor 40″, which results in the voltage at the junction 43″ being positive with respect to ground. Thereby, the diode 44‴ is biased off to prevent discharge of the capacitor 40″. Upon termination of the advance pulse 68, the bus 41 is restored to ground, and the capacitor 40″ discharges through the diode 44‴ to ground. This discharge of the third unit 14 capacitor 40″ through the input winding 34‴ sets the fourth core 24 in state P. The signal represented by the state P is thereby transferred from the third core 22 to the fourth core 24. The capacitors 40, 40′, 40‴ of the other units 10, 12, 16 remain substantially uncharged (except for noise pulses discussed below) during the advance pulse 68. Therefore, the cores 18, 20, and 22 are in state N upon termination of the pulse 68. Thus, there is effectively a transfer of the state N from the associated preceding cores.

There are two portions of the capacitor discharge which are indicated in the graph of Figure 3 at the waveform bearing the legend "voltage on capacitor 40″." The first portion 72 of this discharge is relatively slow due to the relatively large impedance presented by the winding 34‴ during the change of state of the core 24. After the core 24 is saturated in state P, the impedance of the winding 34‴ is relatively small, and the second portion 74 of the discharge is faster.

During the advance pulse 68 which reverses the state of the third core 22, a pulse is induced in the third core input winding 34″, which pulse tends to pass in the forward direction through the discharge diode 44″ connected to that input winding 34″. However, at the same time, the positive pulse 70 is applied to the bus 41 to bias the diode 44″ in the reverse direction and prevent the passage of the pulse induced in the winding 34″ back to the capacitor 40′ of the second unit 12. By this arrangement, undesired backward flow of signals to preceding cores is prevented.

The next advance pulse 68 restores the core 24 to state N and produces a voltage pulse 76 (first line of Figure 3) across the resistor 54. As illustrated by the waveforms of Figure 3, the capacitor 40‴ is charged negatively at that time. Upon termination of the pulse 76, the capacitor 40‴ discharges through the diode 44 and the winding 34 to set the first core 18 to state P. This operation is repeated for each advance pulse, in effect, which causes transfer of the state of each core to its associated succeeding core.

The output signals are taken at the terminal 50 with respect to ground. The voltage with respect to ground at the junction 43‴, which is the output voltage, is positive during the pulse 76 across the resistor 54. This voltage (referenced by the numeral 78 in Figure 3) is a net positive voltage, because the voltage 76 is made to be greater than the induced voltage to which the capacitor 40‴ is charged. Upon termination of the pulse 76, the voltage at the bus 41 falls to substantially ground potential, and the voltage at the junction 43‴ falls to substantially the voltage across the capacitor 40‴. Thus, a negative-going output pulse 80 is produced corresponding in shape to the waveshape of the voltage across the capacitor 40‴ at that time.

The magnetic materials used for the cores may have hysteresis loops which depart considerably from the ideal of a rectangular hysteresis loop. The residual flux density $B_r$ in such non-rectangular loop materials may be substantially less than the saturated flux density $B_s$, as indicated graphically in Figure 2. A core of such non-rectangular loop material at remanence in state N is in a state corresponding to point $N_2$ of Figure 2. An advance pulse 68 drives the core further into saturation to point $N_1$ causing a "noise" flux change and inducing a small noise pulse 82, illustrated in Figure 4, in the output winding of the core. A second pulse 84, illustrated in Figure 4, of opposite polarity is induced in the output winding upon termination of the advance pulse 68 and the return of the core to its remanent state $N_2$. It is believed that the state of the core as represented by a point on the characteristic, actually traverses a minor hysteresis loop, not fully shown in Figure 2. The amplitude and shape of the noise pulse 82 are affected by mutual inductance between the windings as well as by the non-rectangular hysteresis curve of the core materials.

All of the cores which are in state N induce these "noise" voltage pulses 82, 84 in their respective output windings when an advance pulse 68 is applied. The positive-going noise pulse 84 is blocked by the high back resistance of the charge diode, for example, the last stage diode 42‴. The pulse 82, however, is passed by the diode 42‴ and charges the capacitor 40‴ to a voltage shown as 86 in Figure 3. The output signal is a positive pulse 88 during the pulse 70 developed across the resistor 54. Upon termination of the pulse 70, it has been observed, the output voltage at the junction 43‴ differs but a negligible amount from ground potential. This observation may be explained by the following circuit conditions at the time of termination of the voltage pulse 70 and the return of the bus 41 toward ground potential:

In that time period, the third stage capacitor 40″ is discharging a signal pulse through the fourth core input winding 34‴ to change that core 24 to state P. This is the time period indicated in Figure 3 by the waveform portions 72 and 74 for the capacitor 40″. This capacitor 40″ discharge current flowing through the resistor 54 tends to maintain the bus 41 above ground potential. Thereby, the voltage at the terminal 43‴ of the last stage capacitor 40‴ is maintained close to ground potential. As a result, only a slow discharge of the noise voltage 86 from the capacitor 40‴ is permitted; this discharge current in the input winding 34 of the first core 18 is apparently sufficiently small so that it does not produce a magnetizing force large enough to affect the remanent state of the first core 18. Thus, the impedance of the input winding 34 remains very small compared to the resistance of the resistor 54 during the discharge of the noise voltage 86 from the capacitor 40‴. Accordingly, most of the voltage drop due to this discharge is across the resistor 54, and very little voltage is produced across the series combination of the small impedance of the input coil 34 and the small forward resistance of the diode 44, which series combination forms the impedance between the output terminal 50 and ground. Therefore, the voltage at the output terminal 50 is substantially ground potential when the pulse 70 terminates, and the positive pulse 88 is the only substantial effect on the output of a noise pulse 86.

The positive noise pulse 88 and the positive portion 78 of the signal pulse that appear at the output terminal 50 are in the direction to bias the base of the transistor 66 in the reverse or non-conducting direction. Thus, the positive output pulses 88 and 78 are blocked by the transistor 66. However, the negative-going signal pulse 80 biases the base-emitter path of the transistor 66 in the forward direction, which results in a current pulse 90 through the collector-emitter path. This pulse 90 is of the same polarity as the advance pulses 68 and may be used as an advance pulse in another ring counter (not shown).

Ring counters of the same or different numbers of stages may be conveniently cascaded in this manner to provide a frequency divider. For example, the four-stage counter shown in Figure 1 produces one output pulse 80 for each four input pulses 67. A three-stage counter in a similar manner, divides down by three; five-stage and seven-stage counters respectively divide down by five and seven. A frequency divider chain of such register counters that respectively divide down by 7, 5, 5, and 3 may be used to provide a total frequency division of 525. Such a chain of cascaded counters may be used in a television synchronizing generator to lock the frame pulse frequency to the line pulse frequency in the correct submultiple relationship. Only twenty magnetic cores are required by these four divider counters.

Due to the pulse 80 being the only substantial negative-going output signal, and due to the effective blocking of positive-going signal components, large signal-to-noise ratios have been observed. The negative signal pulse 80 has a sharp leading edge, which leading edge is produced by the termination of advance pulses 68 having a relatively short fall time; these pulses 80 are not produced by the change in flux of a magnetic core, which generally gives a smaller slope to the edge of a pulse. The capacitor 40''' is fully charged by a pulse induced in the output winding 36''' before this capacitor 40''' is permitted to discharge. Thus, a relatively low input impedance of the transistor 66 does not load the output winding 36''' nor affect the voltage to which this capacitor 40''' is charged. By applying the diode-blocking pulses 70, 76 to the storage capacitors 40 to 40''' in the manner of this invention, the transfer of noise pulses between stages is effectively prevented. The noise voltage 86 across the capacitor 40''' is discharged without a substantial effect on the flux in the first core 18; and similar noise voltages across the other capacitors are likewise discharged without substantial effects on the succeeding cores.

There is a phase difference between the input pulses 67 applied to the transistor 56 and the negative-going output pulses 80 that are applied to the transistor 66. This phase difference is a delay corresponding to the duration of the input pulse 67. The stepping register of Figure 1 may be adapted for use with vacuum tubes instead of transistors by reversing the polarities of the diodes in the coupling circuits and by appropriate adjustment of the relative senses of linkage of the core windings. With such modifications, the output pulses would be positive, instead of negative, and appropriate for driving a tube.

Thus, a new and improved magnetic stepping register is provided. Noise signals are substantially eliminated, and the register may be used as a ring counter.

What is claimed is:

1. A magnetic system comprising a plurality of magnetic elements operatively arranged in order, said elements being made of a material having two stable remanent states, input, output, and advance windings linked to each of said elements, a common impedance, means for simultaneously applying current pulses to said advance windings and to said common impedance, separate means coupling said output winding of each of said elements to said input winding of the succeeding order element, each of said coupling means including separate electrical means for storing during said current pulses signals induced in the associated one of said output windings, and a unidirectional impedance means to control the flow of signals from said storage means to the associated one of said input windings, said magnetic system further comprising means for applying voltage pulses developed across said common impedance during said current pulses to said signal storage means in a direction to produce a reverse bias across said unidirectional impedance means, and means connected across the series combination of one of said storage means and said common impedance for deriving output signals thereacross.

2. A magnetic system comprising a plurality of magnetic elements operatively arranged in order, said elements being made of a material having two stable remanent states; separate input, output, and advance windings linked to each of said elements; a common impedance; means for applying current pulses to said advance windings and said common impedance in series; separate means coupling said output winding of each of said elements to said input winding of the succeeding order element; each of said coupling means including two diodes poled in the same direction and connected in series between the associated ones of said output and input windings, and a capacitor having one terminal connected to the junction of said diodes and another terminal connected to associated ones of said output windings; and means for applying voltage pulses developed across said common impedance during said current pulses to the other terminal of each of said capacitors to produce a reverse bias across one of said diodes of each of said coupling means to control thereby the transfer of signals from said output to said input windings of adjacent order elements.

3. A magnetic system comprising a plurality of magnetic elements operatively arranged in order, said elements being made of a material having two stable remanent states, separate input and output windings linked to each of said elements, capacitor means for coupling said output winding of a first one of said elements to the input winding of a second one of said elements, a first terminal of said capacitor means being directly connected to a first terminal of said first element output winding, a first unidirectional element connected between a second terminal of said first element output winding and a second terminal of said capacitor means, a second unidirectional element connected between said capacitor means second terminal and a first terminal of said second element input winding, means for simultaneously applying magnetizing forces to said elements during certain time periods, and means including a common impedance connected between said capacitor means first terminal and a second terminal of said second element input winding for applying during said time periods a voltage tending to oppose forward conduction through said second unidirectional element.

4. A magnetic system comprising a plurality of magnetic elements operatively arranged in order, said elements being made of a material having two stable remanent states, separate input and output windings linked to each of said elements, capacitor means for coupling said output winding of a first one of said elements to the input winding of a second one of said elements, a first terminal of said capacitor means being directly connected to a first terminal of said first element output winding, a first unidirectional element connected between a second terminal of said first element output winding and a second terminal of said capacitor means, a second unidirectional element connected between said capacitor means second terminal and a first terminal of said second element input winding, means for simultaneously applying magnetizing forces to said elements during certain time periods, means including a common impedance connected between said capacitor means first terminal and a second terminal of said second element input winding for applying during said time periods a voltage tending to oppose forward conduction through said second unidirectional element, and means connected across said second terminals of said capacitor means and of said second element input winding for deriving output signals.

5. A magnetic system as recited in claim 3 and further comprising signal responsive means connected across said second terminals of said capacitor means and of said second element input winding for deriving output pulses of a single polarity.

6. A magnetic system comprising a plurality of magnetic cores operatively arranged in order, said cores being made of a material having two stable remanent states; separate input, output, and advance windings linked to each of said cores; separate means coupling said output winding of each of said cores to said input winding of the succeeding order core, each of said coupling means including two diodes poled in the same direction and connected in series between terminals of the associated ones of said output and input windings, and a capacitor having at one terminal connected to the junction of said diodes and another terminal connected to the associated ones of said output windings; means for applying current pulses to said advance windings; and means including a common impedance connected between the other terminals of said capacitors and said input windings for applying during said current pulses voltages tending to oppose forward conduction in said diodes connected to said input windings.

7. A magnetic system comprising a plurality of magnetic cores operatively arranged in order, said cores being made of a material having two stable remanent states; separate input, output, and advance windings linked to each of said cores; separate means coupling said output winding of each of said cores to said input winding of the succeeding order core, each of said coupling means including two diodes poled in the same direction and connected in series between terminals of the associated ones of said output and input windings, and a capacitor having one terminal connected to the junction of said diodes and another terminal connected to the associated ones of said output windings; means for applying current pulses to said advance windings; means connected between the terminals of said capacitors and said input windings for applying during said current pulses voltages tending to opposed forward conduction in said diodes connected to said input windings, and a transistor having first and second terminals respectively coupled to said one terminal of one of said capacitors and the other terminal of the associated input winding, and output means coupled to a third terminal of said transistor, whereby unidirectional output pulses are derived.

References Cited in the file of this patent

UNITED STATES PATENTS

| | | |
|---|---|---|
| 2,708,722 | An Wang | May 17, 1955 |
| 2,825,890 | Ridler et al. | Mar. 4, 1958 |

FOREIGN PATENTS

| | | |
|---|---|---|
| 730,165 | Great Britain | May 18, 1955 |

OTHER REFERENCES

"Transistor Pulse Generators," in November 1955, issue of "Electronics," pages 132–133, vol. 28, No. 11.

"A Versatile Transistor Circuit," by Cooke-Yarborough, October 1954 issue of "The Proceedings of the Institution of Elect. Engr.," pages 567–568, vol. 101, No. 83 (part II). Copy in Div. 51.